United States Patent [19]

Filer

[11] 4,292,731
[45] Oct. 6, 1981

[54] TUBE REMOVAL MACHINE

[75] Inventor: Burt Filer, New Hope, Pa.

[73] Assignee: Sandra Lee Filer, New Hope, Pa.

[21] Appl. No.: 135,220

[22] Filed: Mar. 31, 1980

[51] Int. Cl.³ ............................................. B23P 15/26
[52] U.S. Cl. ..................................... 29/726; 198/836; 29/426.4
[58] Field of Search ................. 29/726, 727, 426.4, 29/426.3; 198/836

[56] References Cited

U.S. PATENT DOCUMENTS

| | | | |
|---|---|---|---|
| 2,167,818 | 8/1939 | Wagner | 198/836 X |
| 3,339,710 | 9/1967 | Micgielse | 198/836 X |
| 3,837,062 | 9/1974 | Ohmstede | 29/726 |
| 3,924,316 | 12/1975 | Matlock | 29/726 X |
| 4,095,335 | 6/1978 | Lassarat | 29/726 |
| 4,125,928 | 11/1978 | Cawley | 29/282 |

Primary Examiner—Jimmy C. Peters
Attorney, Agent, or Firm—Z. T. Wobensmith, 2nd; Z. T. Wobensmith, III

[57] ABSTRACT

A machine is provided for removing the entire length of a tube from a heat exchanger or the like, after the expanded end portions thereof have been extracted a short distance from the outer face of the tube sheet, utilizing a power driven chain conveyor with toothed links which engage and grip the outside of the tube, wedging the tube into a coacting trough or shoe which can be applied to the tube at a selected location along its length and draws the tube through the machine and clear of the exchanger.

18 Claims, 7 Drawing Figures

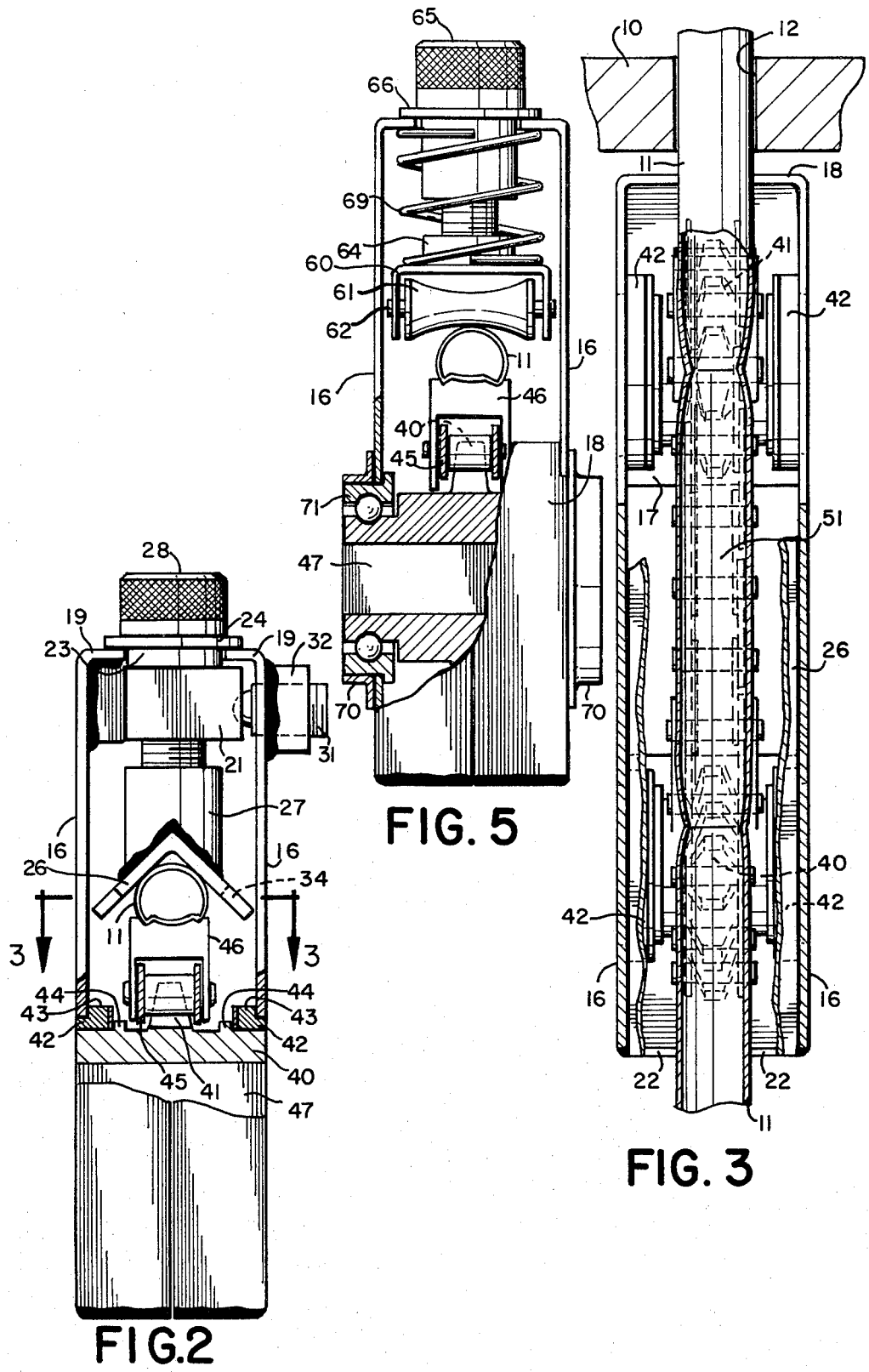

TUBE REMOVAL MACHINE

BACKGROUND OF THE INVENTION

1. Field of the Invention

This invention relates to apparatus for removing or stripping tubes completely from a heat exchanger, condenser, boiler or the like.

2. Description of the Prior Art

Various tools have been suggested for forcibly extracting the expanded portions of tubes from their tube sheet holes. One such tube extractor is described in my copending application for Letters Patent for Tube Extractor, Ser. No. 950,276, filed Oct. 11, 1978, now U.S. Pat. No. 4,213,239. In that application an hydraulically activated broach is inserted into the tube end, expanded into cutting engagement with the inside diameter of the tube by a conically pointed mandrel within the broach, and then withdrawn, bringing the tube with it. The stroke of the this tool is a few inches, which is sufficient since the expanded portion does not often exceed this distance. After initiating the withdrawal of the tube with this or any other desired structure more rapidly acting equipment for further tube removal is desirable.

Lassarat, in U.S. Pat. No. 4,095,335, describes an automatic tube puller having a mandrel which is first threaded into the end of a tube. An hydraulic cylinder with a central bore is manually fitted around the mandrel, which it then grips with an external collet. The cylinder must apply sufficient force to break the expanded joint on the first stroke, that is, several tons. On subsequent strokes the collet will work its way up the mandrel and onto the tube, finally removing the tube completely from the exchanger. While the Lassarat tube puller is versatile in that it performs both extraction and removal of a tube, this structure is slow in operation and subject to other limitations. Insertion of the mandrel, fitting on the cylinder, and taking the first stroke to break the joint takes considerable time and does not compare favorably with other automatic tube extractors for this type of operation. In the removal phase it is also slow because of the many strokes that must be taken and because the piston must return to the front of the cylinder between strokes. The inherent low speed-high power characteristics of the Lassarat apparatus while necessary for initially extracting the tube, are not necessary for further removal.

Crawley and Ohmstede, in U.S. Pat. No. 4,125,928, describe an hydraulically reciprocable gripping and stacking device, fitted into a stationary framework, to which the exchanger must be attached after the shell has been removed. While suitable in some instances, the requirement that the exchanger be completely dismantled, the tube sheets and shell removed, and the tube bundle set up in the frame are serious drawbacks. This apparatus is not intended to remove tubes through tube sheets holes of an exchanger in situ.

SUMMARY OF THE INVENTION

In accordance with the invention a tube removal machine is provided for removal of the entire length of a tube from a heat exchanger, after the expanded end portions thereof have been extracted a short distance clear of the tube sheet, employing a power driven chain conveyor within a partially open casing, with toothed links on the chain contacting and gripping the outside of the tube near the extracted end, at the open portion of the conveyor casing, continuous contact between the teeth and the tube being effected by an adjustable clamp which holds a trough or shoe and which may have rollers therein, against the opposite side of the tube from that engaged by the chain teeth so that torque applied to the driving sprocket causes the teeth to drag the tube through the trough and expel it through the back of the machine through another opening in the conveyor casing, the clamp and trough being slidably removable from the casing to allow midspan or other selected engagement, if required, the front end of the trough being shaped to bear on the relatively thin ligaments of metal between adjacent tube holes on the tube sheet.

The principal object of the invention is to provide tube removal means which is rapid in operation.

A further object of the invention is to provide a tube removal machine whose initial engagement with the tube may be effected simply and quickly.

A further object of the invention is to provide a tube removal machine which will engage each tube in a closely spaced row in sequence.

A further object of the invention is to provide a tube removal machine which will open up to engage a tube midspan, when required.

A further object of the invention is to provide a tube removal machine which is energy efficient in that actual deformation of the tube material is minimized.

A further object of the invention is to provide a tube removal machine which is adjustable to receive tubes of varying diameters.

A further object of the invention is to provide a tube removal machine which may be driven by a wide variety of power sources and for easy engagement therewith.

A further object of the invention is to provide a tube removal machine which is relatively small, light in weight and easy to operate.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 2 is an end elevational view of the machine and tube as seen from the right of FIG. 1, with a sprocket and bearings in partial section and with one backstop removed to show the clamp retainer;

FIG. 3 is a longitudinal sectional view taken approximately on the line 3—3 of FIG. 2;

FIG. 5 is an end elevational view of the machine of FIG. 4;

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

A typical heat exchanger utilizes an outer shell with tube sheets at each end with tubes running between the tube sheets and with their ends connected to the tube sheets by mechanical expansion or swaging. The tubes are usually closely spaced to permit of a large number of tubes of the order of hundreds or thousands being mounted within a shell of a few feet in diameter. The length of the tubes and of the shell may vary but the tubes are frequently long and in the case of steam surface condensers may exceed forty feet in length.

Heat exchanger tubes have a finite service life and must be periodically replaced. This usually entails cutting the tubes at some point midway of their length and forcibly withdrawing the expanded end portion a few inches from the tube sheets, usually requiring a force of several tons, until the remainder can be pulled out by hand or in some other manner. The remainder of the tube may slide freely if the heat exchanger is in clean service but the tubes may offer intermittent or steady resistance of a few hundred pounds if scaled or dirty. In any event speed of withdrawal and removal is important because of the large number of tubes involved and to reduce shut-down time. The machine of the present invention as will be hereinafter apparent is particularly suitable for such rapid removal.

Figure 1:
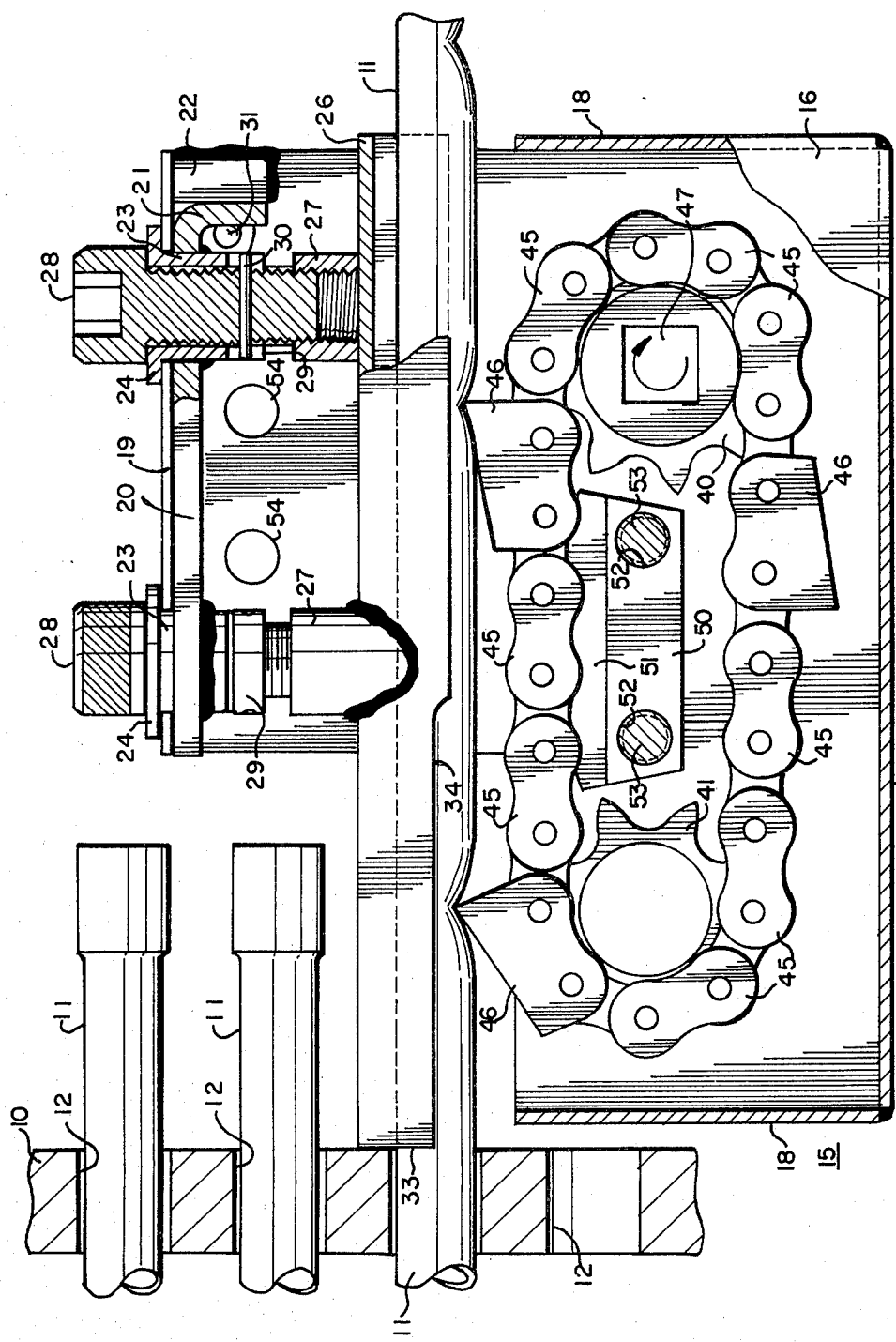
FIG. 1 is a side elevational view of the machine in the process of removing a tube from an exchanger, part of the housing being broken away to show the toothed conveyor and with portions of the clamp and shoe shown in section.

Referring now more particularly to FIGS. 1, 2 and 3 one preferred embodiment of the invention is there illustrated.

A tube sheet 10 is shown from which a plurality of heat exchanger tubes 11 are to be withdrawn through tube holes 12.

A housing 15 is provided preferably of separable halves with spaced side walls 16 longer at their lower portion, bottom walls 17 extending toward each other, lower end walls 18 at each end, extending toward each other, and upper horizontal tabs 19 extending toward but spaced apart from each other.

At the upper part of the housing 15 a slide plate 20 is provided having a downturned foot 21 for engagement with backstops 22 welded to the side walls 16 at the top.

The slide plate 16 has spaced collars 23 extending therethrough and welded thereto, for interposition between the tabs 19 with rims 24 for supporting engagement on the top faces of the tabs 19.

A trough or shoe 26 is provided shown as having an inverted V-shape, in cross section but which may be curved or arcuate in cross section if desired. The trough or shoe 26 can be made of steel or, if desired, of a low friction material such as bronze to aid in the progress of the tube through the machine.

The trough or shoe 26 preferably has a plurality of internally threaded sleeves 27 welded thereto for the reception of clamp screws 28 extending downwardly through the collars 23. Retainer rings 29 mounted on the clamp screws 28 and held by pins 30 permit rotational freedom while retaining axial rigidity. The clamp screws 28 are employed to raise or lower the trough or shoe 26 to accommodate tubes 11 of different diameters.

In order to retain the slide plate 20 in position for assembly and disassembly a spring pressed ball plunger 31 is provided in threaded engagement in a sleeve 32 welded to one of the side walls 16.

The trough or shoe 26 has an end face 33 for engagement with the tube sheet 10 and a cutaway portion at 34 to permit fitting between adjacent tubes 11 and for bearing of the end face 33 on the thin ligament of metal between the openings 12.

Within the lower part of the housing 15 spaced driving and driven sprockets 40 and 41 are journaled in bearings 42 carried by the side walls 16. The bearings 42 can be of any preferred type but as illustrated have interior thrust rings 43 engaged by rings 44 on the pulleys 40 and 41.

The sprockets 40 and 41 support and carry a roller chain 45 on which are mounted for movement thereby a plurality of teeth 46. The shape of the tooth 46 can be varied as desired but is preferably of a shape such that it can easily be sharpened. The teeth 46 can also be spaced so that only one tooth 46 engages the tube 10 to propel it. If resistance is high the teeth 46 can be more closely spaced on the chain 45.

Within the housing 15 a casing block 50 is provided having an upper rim 51 which supports the upper span of the chain 45 by bearing against the rollers of the chain 45. The block 50 has a plurality of threaded holes 52 for screws 53 which retain the halves of the housing 15 in assembled relation. Additional holes 54 may be provided for additional bolts (not shown) for additional holding of the upper part of the housing 15 in assembled relation.

The sprocket 40 is preferably driven by an air motor (not shown) with its shaft engaged in a square driving opening 47.

The mode of operation will now be pointed out.

With the machine in assembled relation it is advanced with respect to the tube to be withdrawn and with the end 33 of the shoe 26 close to the tube sheet 10. The shoe 26 is then tightened against the tube 11 to be withdrawn so that the chain teeth 46 can engage the tube 11. The shoe 26 holds the tube so that the teeth 46 can come into action, supported from below by the upper rim 51 of the casing block 50. Overtightening of the shoe 26 will waste power and time and indentations can be kept to a minimum by careful adjustment of the screws 28. The cut-away portion 34 permits of movement of the machine from tube to tube across a row sequentially without interference of any portion of the machine with the projecting ends of the remaining tubes 11. Adjustability for clamping tubes from five-eighths of an inch OD to one and one quarter inch OD is available.

As the chain 45 advances each of the teeth 46 in sequence which is riding upwardly on the sprocket 41 cuts into the tube 11 with a rigid positive bite and causes it to move outwardly through the tube sheet 10. Successive teeth 46 engage the tube 11 and advance it outwardly. Using a two horsepower air motor at 350 rpm. and with a two inch diameter driving sprocket 40 a force in excess of 500 pounds will be exerted to propel the tube 11 at a speed of 180 feet per minute.

An alternative mode of operation is also available. For a heat exchanger with fewer tubes 11 of shorter lengths the tubes 11 may often be pulled out by hand. If such a tube 11 is stuck part way out, the operator will remove the slide plate 20 by pushing it forward against the resistance of the ball plunger 31 and sliding it out. The housing 15 is then fitted around the tube 11 in the vicinity of the tube sheet 10 and the slide plate 20 is then replaced. Operation will then be similar to that previously described.

When midspan engagement is frequently used a chain 45 with only one or two teeth 46 is desirable and makes it easier to replace the slide plate 20 after fitting the housing 15 around the tube 11.

It will be noted that the slide plate 20, as pointed out above can be readily removed from the housing 15.

The housing 15 can also be quickly disassembled by removing the bolts 53 and separating the halves of the housing 15 for access to the chain 45, the teeth 46 and the sprockets 40 and 41.

Figure 4:
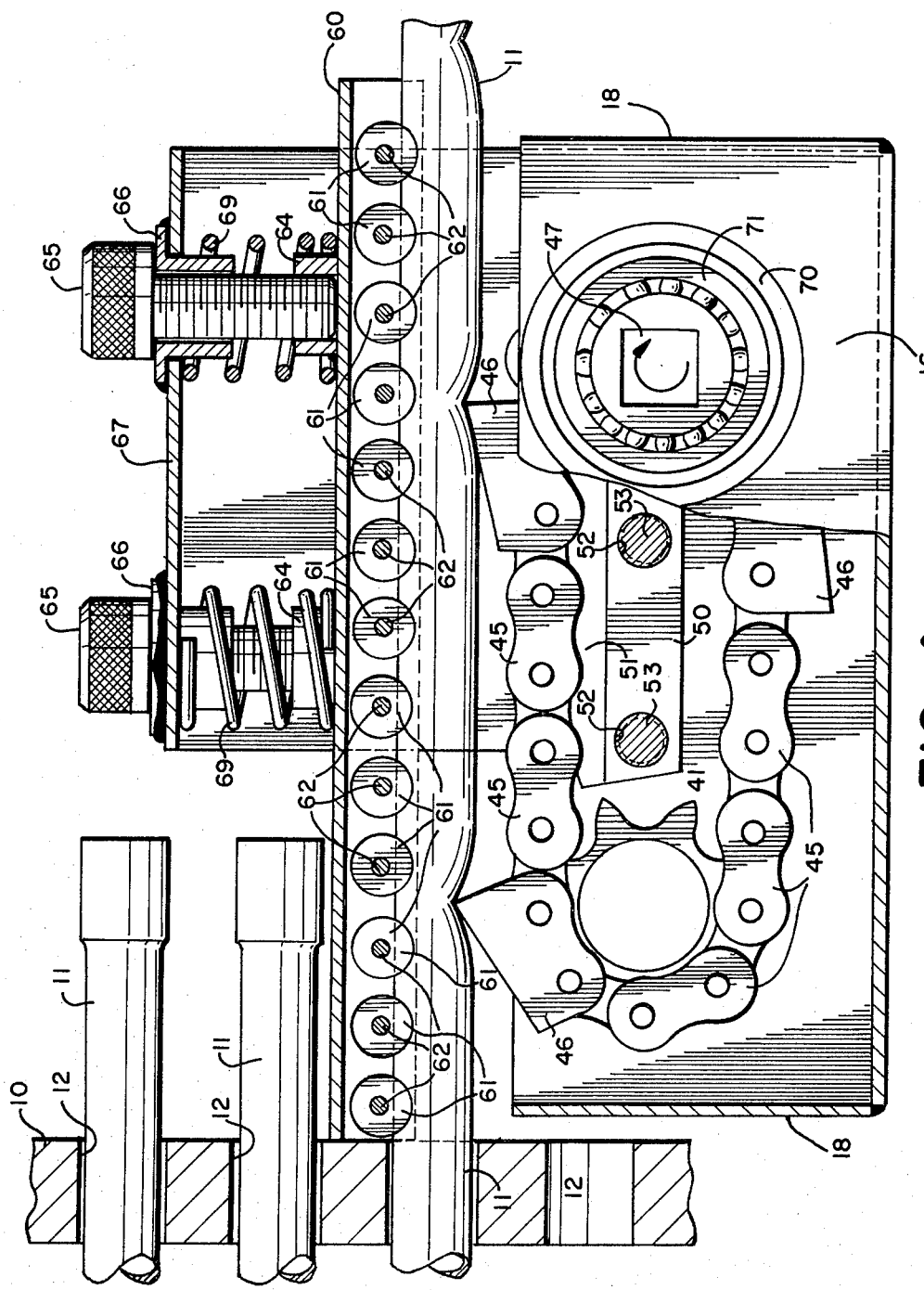
FIG. 4 is a view similar to FIG. 1 showing another embodiment of the invention which has a non-removable clamp and a series of rollers providing the trough.

Referring now to FIGS. 4 and 5 of the drawings, in the embodiment of the invention there shown in place of the trough or shoe 26 a U-shaped channel 60 is provided having a plurality of grooved rollers 61 carried on shafts 62 mounted in the sides of the channel 60. The forward end of the channel 60 has an end face 63 for engagement with the tube sheet 40. The channel 60 has internally threaded sleeves 64 welded thereto for the reception of bolts 65 similar to the bolts 28 which extend downwardly through sleeves 66 welded to a top wall 67 which extends across and closes the space between the side walls 16 previously referred to.

The bolts 65 have springs 69 thereon which permit of upward movement of the channel 60 and the bolts 65 against the force of the springs 69. In other aspects the structure of the chain 45, teeth 46, driving and driven sprockets 40 and 41 is similar to that previously described. It is preferred to provide exterior hubs 70 for the reception of ball bearings 71 for the sprockets 40 and 41.

Upon removal of the bolts 65 the channel 60 and the rollers 61 can be removed and upon removal of the bolts 53 and separation of the lower part of the housing 15 the sprockets 40 and 41 can be separated from the side walls 16 and the chain 45 and teeth 46 removed from the housing 15.

Figures 6, 7:
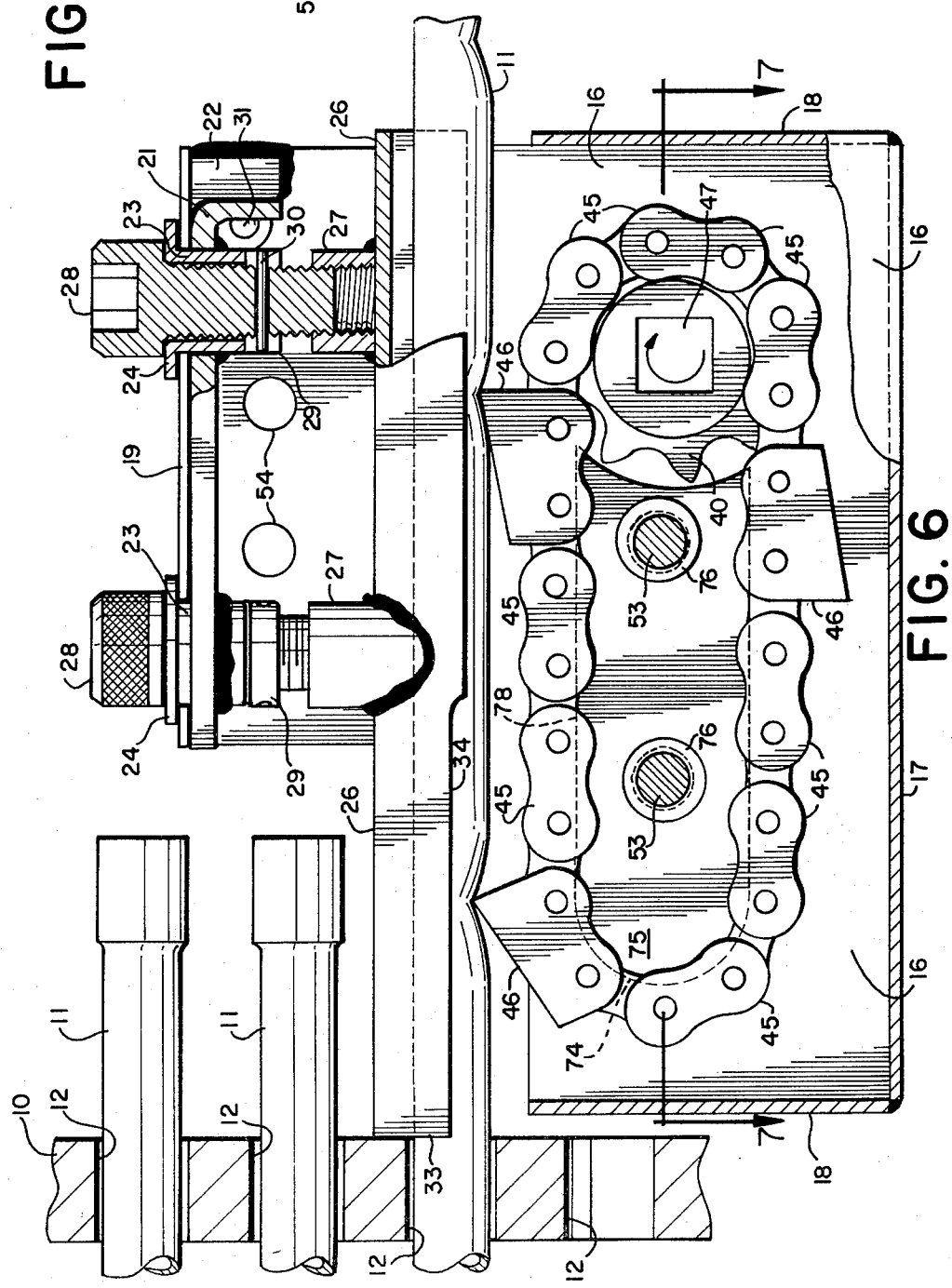
FIG. 6 is a view similar to FIG. 1 showing another embodiment of the invention and showing a different support for the chain.
FIG. 7 is a horizontal sectional view taken approximately on the line 7—7 of FIG. 6.

Referring now to FIGS. 6 and 7 in the embodiment of the invention there shown, in place of the sprocket 40, a support plate 75 is provided having an arcuate end 74 along which the roller chain 45 is movable and with the sprocket 41 for driving the chain 45 at its other end. The plate 75 has spaced bosses 76 extending from each side face thereof with internal threads 77 for reception of bolts 53 as before for assembly and disassembly. The upper edge 78 of the plate 75 supports the chain 45 between the arcuate end 76 and the sprocket 41.

I claim:

1. A tube removal machine for positioning in front of a tube sheet comprising
   a housing,
   a longitudinally elongated member carried in said housing and extending from said tube sheet for engagement under pressure along one side face portion of a tube to be removed, and
   means in said housing for advancing the tube to be removed,
   said means including a driving member carried on an endless chain having a rigid portion for gripping engagement with the opposite side face portion of said tube from that with which said elongated member is in engagement.

2. A tube removal machine as defined in claim 1 in which
   said driving member comprises a driving and a driven sprocket, an endless chain on said sprockets, said portion for engagement with said tube having a tooth carried by said chain, and a member in engagement with said chain for retaining said tooth in engagement with the tube to be removed.

3. A tube removal machine as defined in claim 1 in which
   said elongated member has portions for retaining the tube therein.

4. A tube removal machine as defined in claim 1 in which
   said elongated member is of inverted V-shape in transverse cross section.

5. A tube removal machine as defined in claim 1 in which
   said elongated member comprises a plurality of rollers.

6. A tube removal machine as defined in claim 5 in which
   said rollers are rotatably carried in an inverted channel.

7. A tube removal machine as defined in claim 1 in which
   said elongated member is connected to said housing by a plurality of removable bolts.

8. A tube removal machine as defined in claim 7 in which
   said bolts are adjustable for varying the force applied on said elongated member.

9. A tube removal machine as defined on claim 7 in which
   resilient members are provided in engagement with elongated member for urging said member into tube engagement.

10. A tube removal machine as defined in claim 6 in which
    resilient members are provided in engagement with said channel for urging said rollers into tube engagement.

11. A tube removal machine as defined in claim 1 in which
    said housing comprises a plurality of housing portions, and
    said housing portions are separable for access to said advancing means.

12. A tube removal machine as defined in claim 11 in which
    said member for retaining said chain provides a spacer for said housing portions.

13. A tube removal machine as defined in claim 2 in which
    one of said sprockets urges said tooth into gripping engagement with the tube to be removed.

14. A tube removal machine as defined in claim 2 in which
    said endless chain has a plurality of teeth carried thereby.

15. A tube removal machine as defined in claim 2 in which
    said sprockets are journalled in said housing.

16. A tube removal machine as defined in claim 1 in which
    said elongated member has an end face for engagement with a tube sheet from which a tube is to be removed.

17. A tube removal machine as defined in claim 1 in which
    said driving member comprises a supporting plate and a driving sprocket, an endless chain carried on said plate and said sprocket, said portion for engagement with said tube having a tooth carried by said chain, said supporting plate positioning said chain for retaining said tooth in engagement with the tube to be retained.

18. A tube removal machine as defined in claim 17 in which
said supporting plate has an arcuate end for guiding and retaining said chain and said sprocket is disposed at the opposite end of said plate from said arcuate end.

* * * * *